United States Patent
White et al.

(10) Patent No.: US 9,873,420 B2
(45) Date of Patent: Jan. 23, 2018

(54) METHOD OF INCREASING REGENERATION IN A HYBRID VEHICLE BEYOND WHAT IS CALCULATED FROM REQUESTED VEHICLE DECELERATION

(71) Applicant: GM GLOBAL TECHNOLOGY OPERATIONS LLC, Detroit, MI (US)

(72) Inventors: Marsella L. White, Howell, MI (US); Michael G. Petrucci, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/141,207

(22) Filed: Apr. 28, 2016

(65) Prior Publication Data

US 2017/0072940 A1 Mar. 16, 2017

Related U.S. Application Data

(60) Provisional application No. 62/217,852, filed on Sep. 12, 2015.

(51) Int. Cl.
*B60W 10/18* (2012.01)
*B60W 40/114* (2012.01)
(Continued)

(52) U.S. Cl.
CPC .............. *B60W 10/18* (2013.01); *B60K 6/52* (2013.01); *B60W 10/06* (2013.01); *B60W 10/08* (2013.01); *B60W 20/11* (2016.01); *B60W 30/02* (2013.01); *B60W 30/18127* (2013.01); *B60W 40/114* (2013.01); *B60K 6/48* (2013.01); *B60W 20/00* (2013.01); *B60W 2510/244* (2013.01); *B60W 2540/12* (2013.01); *B60W 2710/0666* (2013.01); *B60W 2710/083* (2013.01); *B60W 2710/18* (2013.01); *B60W 2720/14* (2013.01);
(Continued)

(58) Field of Classification Search
CPC ......... B60W 20/14; B60W 10/18; B60K 6/22; B60Y 2200/92; B60Y 2300/18125; B60Y 2300/91; Y10S 903/947
USPC ........................................................ 701/22
See application file for complete search history.

(56) References Cited

U.S. PATENT DOCUMENTS 9,623,850 B2 * 4/2017 Yamakado ............ B60T 8/1755
2013/0144476 A1 * 6/2013 Pinto ................... B60T 8/17555
701/22

(Continued)

*Primary Examiner* — Jelani A Smith
*Assistant Examiner* — James E Stroud
(74) *Attorney, Agent, or Firm* — Quinn IP Law (57) ABSTRACT

A method of controlling a vehicle includes calculating a desired deceleration limited regeneration torque request based on a requested deceleration input from a driver. If current dynamic operating conditions of the vehicle are in a performance region that permits an increase to the regeneration torque request, the desired deceleration limited regeneration torque request is increased based on a regeneration torque overhead, to define a modified axle regeneration torque request. Modified torque values are output based on the modified axle regeneration torque request. If the torque control values will cause an estimated yaw rate that is less than a target yaw rate, then the modified torque values are applied. Otherwise, the modified torque values are re-defined until the estimated yaw rate is not greater than the target yaw rate, and the re-defined values of the modified torque values are applied.

14 Claims, 2 Drawing Sheets

(51) Int. Cl.
*B60K 6/52* (2007.10)
*B60W 10/06* (2006.01)
*B60W 10/08* (2006.01)
*B60W 30/02* (2012.01)
*B60W 30/18* (2012.01)
*B60W 20/11* (2016.01)
B60K 6/48 (2007.10)
B60W 20/00 (2016.01)

(52) U.S. Cl.
CPC ... *B60W 2720/30* (2013.01); *B60W 2720/403* (2013.01); *B60W 2720/406* (2013.01); *B60Y 2200/92* (2013.01); *B60Y 2300/18125* (2013.01); *Y10S 903/947* (2013.01)

(56) References Cited

U.S. PATENT DOCUMENTS

2015/0239442 A1* 8/2015 Yamakado .............. B60L 3/102
                                                              701/70
2017/0072940 A1* 3/2017 White .................. B60W 20/14

\* cited by examiner

METHOD OF INCREASING REGENERATION IN A HYBRID VEHICLE BEYOND WHAT IS CALCULATED FROM REQUESTED VEHICLE DECELERATION

CROSS-REFERENCE TO RELATED APPLICATIONS

This application claims the benefit of U.S. Provisional Patent Application Ser. No. 62/217,852, filed on Sep. 12, 2015, the disclosure of which is hereby incorporated by reference.

TECHNICAL FIELD

The disclosure generally relates to a method of controlling a hybrid vehicle.

BACKGROUND

Hybrid vehicles may use an energy regeneration device to convert kinetic energy from rotating wheels of the vehicle into some other form of energy. For example, hybrid vehicles using an electric device to provide a propulsive force to an axle typically include an energy storage device, e.g., a battery or other similar device. The energy storage device must be charged, referred to herein as regeneration. Regeneration of the energy storage device may be accomplished in several different ways. For example, the vehicle may use the electric device as the energy regeneration device to regenerate the energy storage device through a regenerative braking process, in which energy used to decelerate the vehicle is converted into electrical energy by the electric device, which is stored in the energy storage device. Alternatively, the kinetic energy from the wheels may be converted into a form of energy other than electrical energy. For example, the energy regeneration device may include a weighted flywheel, in which case the kinetic energy from the wheels is transferred to kinetic energy in the flywheel.

SUMMARY

A method of controlling a vehicle is provided. The method includes calculating a desired deceleration limited regeneration torque request based on a requested deceleration input, and increasing the desired deceleration limited regeneration torque request, based on available additional regeneration capacity of the vehicle and an ability to mitigate any potential yaw induced by the increase. The desired deceleration limited regeneration torque request is increased to a level that will maximize the level of regeneration without upsetting the vehicle dynamic performance at any given vehicle dynamic condition. The increased value of the desired deceleration limited regeneration torque request is defined as a modified axle regeneration torque request. An engine control module then sends at least one control signal to at least one device of the vehicle, to control the device to achieve the modified axle regeneration torque request.

A method of controlling a vehicle is provided. The vehicle includes an axle that is coupled to an energy regeneration device. The method includes calculating a desired deceleration limited regeneration torque request based on a requested deceleration input received from a driver. A vehicle controller determines if current dynamic vehicle operating conditions are disposed within a performance region that permits an increase in the desired deceleration limited regeneration torque request, or if the current dynamic vehicle operating conditions are not disposed within a performance region that permits an increase in the desired deceleration limited regeneration torque request. When the current dynamic vehicle operating conditions are disposed within a performance region that permits an increase in the desired deceleration limited regeneration torque request, a regeneration torque overhead value is calculated from the difference between the total available regeneration torque capacity of the energy regeneration device and the desired deceleration limited regeneration torque request. The desired deceleration limited regeneration torque request may be increased based on the regeneration torque overhead, to define a modified axle regeneration torque request. A modified torque value for each wheel of the vehicle, and a modified Internal Combustion Engine (ICE) torque request are defined. The modified torque value for each wheel is the friction braking torque required to be applied to each wheel of the vehicle in order to enable the modified axle regeneration torque request to the energy regeneration device under the current dynamic operating conditions of the vehicle. An estimated yaw rate of the vehicle is calculated, based on the modified front axle regeneration torque request and the modified torque values for each wheel of the vehicle. An allowable regeneration yaw rate target is compared to the estimated yaw rate to determine if the allowable regeneration yaw rate target is greater than the estimated yaw rate, or if the allowable regeneration yaw rate target is equal to or less than the estimated yaw rate. When the allowable regeneration yaw rate target is greater than the estimated yaw rate, the defined values of the modified axle regeneration torque request and the modified torque values for each wheel of the vehicle are maintained. When the allowable regeneration yaw rate target is not greater than the estimated yaw rate, the modified axle regeneration torque request and the modified torque values for each wheel of the vehicle are re-defined to values that limit the estimated yaw rate to less than the allowable regeneration yaw rate target. A control signal is communicated with a vehicle controller, to control a friction braking device at each wheel of the vehicle to provide the modified torque values for each respective wheel of the vehicle, to achieve the modified axle regeneration torque request for the energy regeneration device, and to achieve the modified ICE torque request.

Accordingly, the amount of torque that the vehicle would normally dedicate for regeneration activities for the current dynamic operating conditions of the vehicle may be increased to optimize regeneration, if the energy regeneration device has extra capacity for regeneration, and the modified regeneration torque would not cause the yaw rate of the vehicle to exceed a target yaw rate.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a method of controlling a hybrid vehicle 20 is generally described. The vehicle 20 may include any type and/or style of vehicle that includes an axle coupled to an energy storage device 38, which is capable of converting or transferring kinetic energy of the vehicle 20 into some other form or into some other device.

Figure 1:
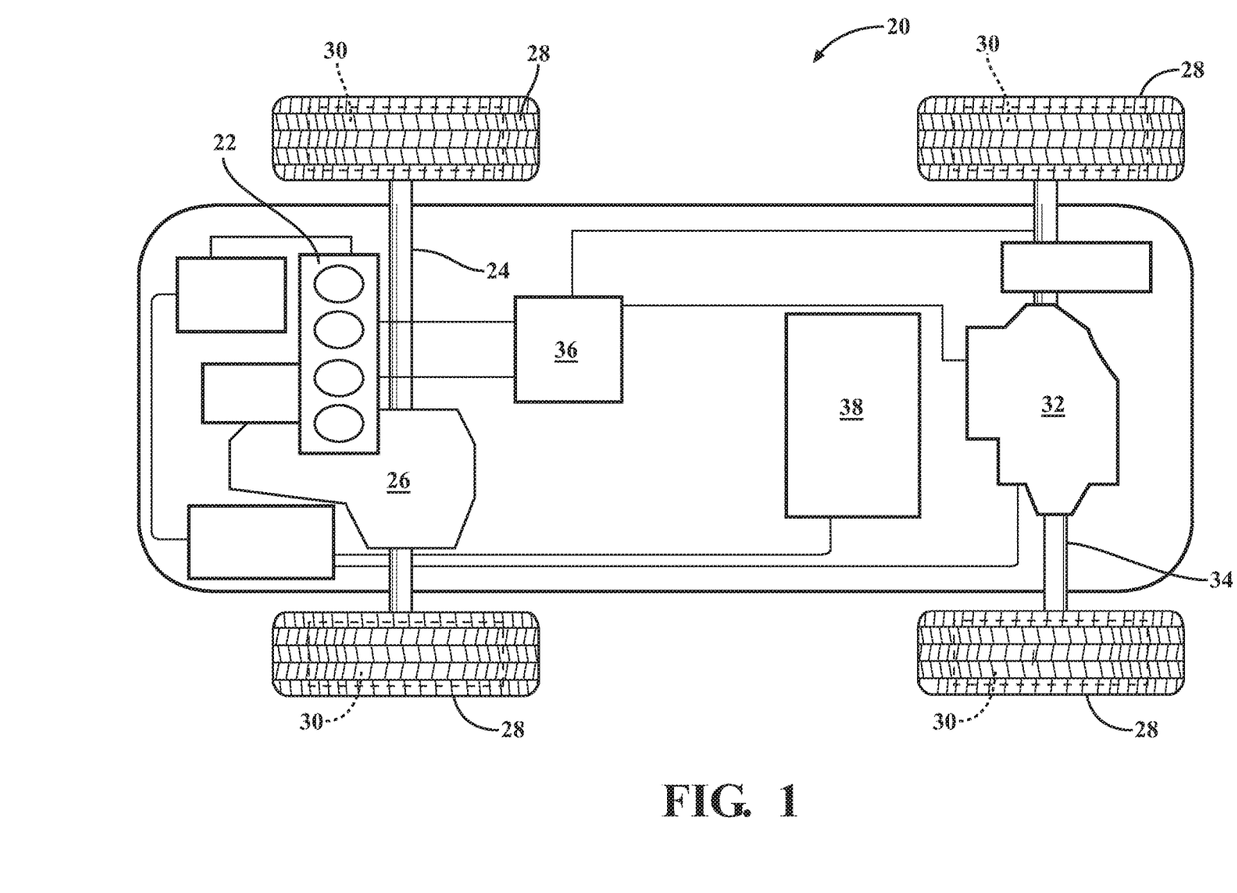
FIG. 1 is a schematic plan view of a vehicle.

One exemplary embodiment of the vehicle 20 is shown in FIG. 1. It should be appreciated that the vehicle 20 may be configured differently than shown in FIG. 1, and that the exemplary embodiment of the vehicle 20 shown in FIG. 1 is provided merely to aid in the understanding of this disclosure. Accordingly, the scope of this disclosure should not be limited to the configuration and specific components of the vehicle 20 shown in FIG. 1 and described herein. As shown in FIG. 1 and described herein, the exemplary embodiment of the vehicle defines and hereinafter refers to an energy regeneration device as an electric device 32. However, it should be appreciated that other embodiments of the vehicle may define the energy regeneration device as some other device, such as but not limited to a weighted flywheel system.

Referring to FIG. 1, the vehicle 20 includes an internal combustion engine 22 coupled to a first axle 24, and operable to provide the first axle 24 with a propulsive force or torque. The internal combustion engine 22 may include any suitable type of engine, such as but not limited to a diesel engine, a gasoline engine, a natural gas engine, etc. Furthermore, the internal combustion engine 22 may be configured in any suitable style, such as but not limited to an inline configuration, a V-style configuration, a rotary configuration, etc. The internal combustion engine 22 may be coupled to the first axle 24 in any suitable manner, using any suitable components, such as but not limited to a gearbox or transmission 26, differential, drive shaft etc. The internal combustion engine 22 operates as is known in the art. As such, the specific details and operation of the internal combustion engine 22 are not described in detail herein. Additionally, the specific manner in which the internal combustion engine 22 is coupled to and transfers torque to the first axle 24 is not pertinent to the teachings of this disclosure, and are therefore not described in detail herein.

The first axle 24 may be configured in any suitable manner to transfer the propulsive torque from the internal combustion engine 22 to at least one wheel 28 attached to the first axle 24. The first axle 24 includes a friction braking device 30 located at each wheel 28 of the first axle 24. The friction braking devices 30 of the first axle 24 use friction to slow rotation of an associated wheel 28, to decelerate the vehicle 20, as is known in the art. The specific configuration and operation of the first axle 24 and the friction braking devices 30 of the first axle 24 are not pertinent to the teachings of this disclosure, and are therefore not described in detail herein.

The vehicle 20 further includes the electric device 32, which is coupled to a second axle 34, and is operable to provide the second axle 34 with a propulsive force or torque. The electric device 32 may include but is not limited to an electric motor, or an electric motor/generator. However, it should be appreciated that the electric device 32 may include some other device capable of converting electrical energy into torque, and supplying that torque to the second axle 34. The electric device 32 may be coupled to the second axle 34 in any suitable manner, using any suitable components, such as but not limited to a gearbox or transmission 26, differential, drive shaft etc. The specific configuration and operation of the electric device 32, and the manner in which the electric device 32 is coupled to and transfers torque to the second axle 34 are not pertinent to the teachings of this disclosure, and are therefore not described in detail herein.

The second axle 34 may be configured in any suitable manner to transfer the propulsive torque from the electric device 32 to at least one wheel 28 attached to the second axle 34. The second axle 34 includes a friction braking device 30 located at each wheel 28 of the second axle 34. The friction braking devices 30 of the second axle 34 use friction to slow rotation of an associated wheel 28, to decelerate the vehicle 20, as is known in the art. The specific configuration and operation of the second axle 34 and the friction braking devices 30 of the second axle 34 are not pertinent to the teachings of this disclosure, and are therefore not described in detail herein.

As shown in the exemplary embodiment of FIG. 1, the internal combustion engine 22 and the electric device 32 may be referred to as de-coupled. As used herein, the term de-coupled is defined as being not mechanically linked, being mechanically independent of each other, and not physically transferring torque therebetween. Accordingly, the internal combustion engine 22 and the electric device 32 are not mechanically linked to each other, and do not physically transfer torque to and/or from each other. As such, the internal combustion engine 22 operates to provide or not provide propulsive torque to the first axle 24, and the first axle 24 operates to provide or not provide friction braking for the vehicle 20, independently of the electric device 32 and the second axle 34. Similarly, the electric device 32 operates to provide or not provide propulsive torque to the second axle 34, and the second axle 34 operates to provide or not provide friction braking for the vehicle 20, independently of the internal combustion engine 22 and the first axle 24. However, other embodiments of the vehicle 20 may include systems that are coupled, in which the wheels 28 of the first axle 24 and the wheels 28 of the second axle 34 are mechanically linked together. Furthermore, other embodiments of the vehicle 20 may include only wheels 28 of one axle that are engaged to propel the vehicle 20. For example, the vehicle 20 may include an electric device 32 attached to only a single axle, such that only the wheels 28 of that single axle are used to propel the vehicle 20, and the remaining wheels 28 of the vehicle 20 are not used for propulsion.

In addition to being capable of providing the propulsive torque to the second axle 34, the electric device 32 is also capable of generating an electrical current that may be used to charge or regenerate an energy storage device 38. The energy storage device 38 may include, but is not limited to, a battery or other similar device that is capable of storing an electrical charge, and providing the stored electrical charge to the electric device 32 for producing the propulsive torque. In other embodiments of the vehicle 20, the energy storage device may include, but is not limited to, a weighted flywheel. For example, the electric device 32 may be configured so that rotation of the wheels 28 attached to the second axle 34, may in turn rotate the electric device 32 to generate a charge, which is stored in the energy storage device 38. In so doing, the torque or resistance that the electric device 32 applies against the rotation of the wheels 28, slows the wheels 28 and may decelerate the vehicle 20. The amount of torque or resistance to the rotation of the wheels 28 connected to the second axle 34 may be varied to control the amount of braking that the electric device 32 provides, while still being used to generate electricity to charge the energy storage device 38.

As shown in FIG. 1, and as described herein, the first axle 24 is disposed at the rearward end of the vehicle 20, and may be referred to as a rear axle, whereas the second axle 34 is disposed at the forward end of the vehicle 20, and may be referred to as a front axle. However, the relative positions of the first axle 24 and the second axle 34 may be reversed, with the first axle 24 disposed at the forward end of the vehicle 20 as the front axle, and the second axle 34 disposed at the rearward end of the vehicle 20 as the rear axle.

The vehicle 20 further includes a vehicle controller 36 for controlling the operation of the internal combustion engine 22 and the electric device 32, as well as the first axle 24 and the second axle 34, including the friction braking devices 30 of the first axle 24 and the second axle 34. The vehicle controller 36 may be referred to simply as a controller, as a control module, such as but not limited to an engine control module, a control unit, such as but not limited to an engine control unit, a computer, etc. The vehicle controller 36 may include a computer and/or processor, and include all software, hardware, memory, algorithms, connections, sensors, etc., necessary to manage and control the operation of the vehicle 20, such as the internal combustion engine 22 and the electric device 32. As such, a method, described below and generally shown in FIG. 2, may be embodied as one or more programs or algorithms operable on the vehicle controller 36. It should be appreciated that the vehicle controller 36 may include any device capable of analyzing data from various sensors or other devices, comparing data, making the necessary decisions required to control the operation of the vehicle 20, and executing the required tasks necessary to control the operation of the vehicle 20.

The vehicle controller 36 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The vehicle controller 36 includes tangible, non-transitory memory on which are recorded computer-executable instructions, including an increased regeneration determination algorithm. The processor of the controller 36 is configured for executing the increased regeneration determination algorithm. The increased regeneration determination algorithm implements a method of controlling the vehicle 20, including controlling the internal combustion engine 22 and the electric device 32, the first axle 24, and/or the second axle 34, including the friction braking devices 30 on the first axle 24 and the second axle 34, in order to optimize the regeneration of the energy storage device 38 for the current dynamic vehicle operating conditions.

Figure 2:
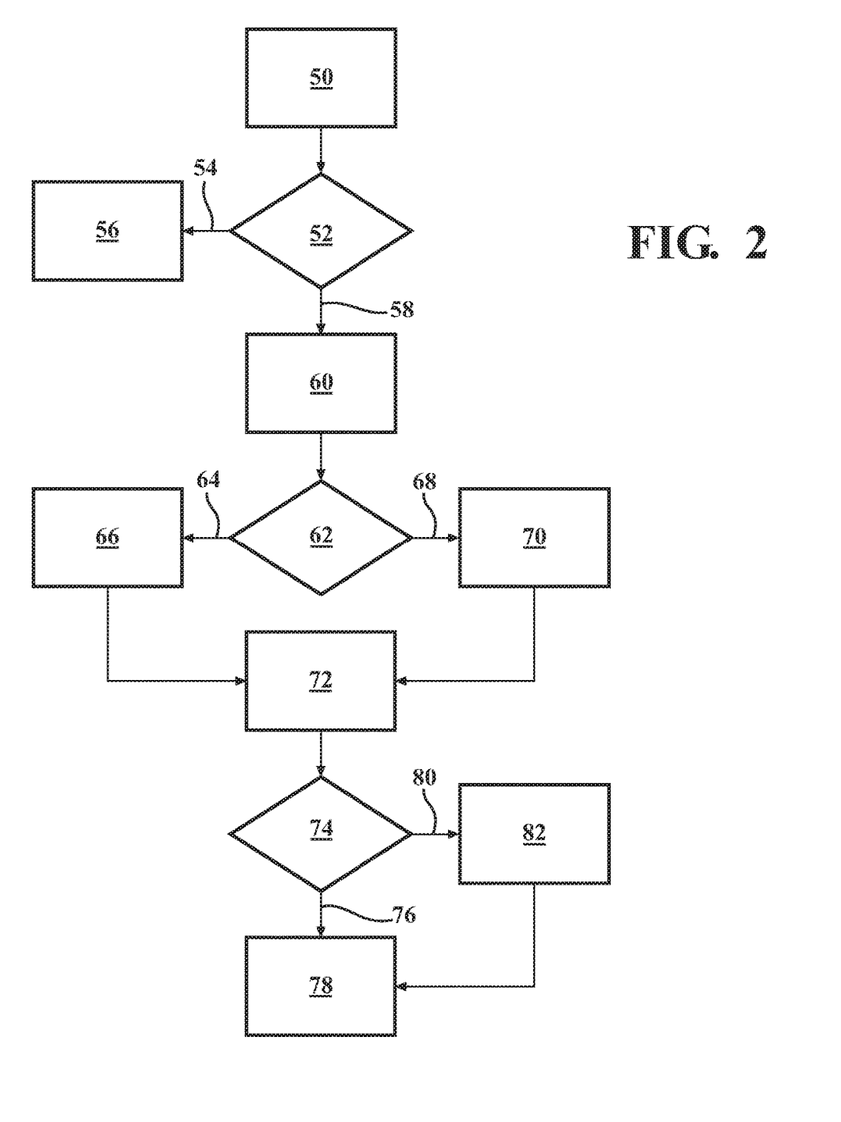
FIG. 2 is a flowchart representing a method of controlling the vehicle.

Referring to FIG. 2, the method of controlling the vehicle 20 includes the vehicle controller 36 communicating with and/or receiving data from several different input sources from various different sensors and/or system controllers of the vehicle 20, generally indicated by box 50. For example, the vehicle controller 36 may include data related to a driver's desired deceleration, an actual torque from the internal combustion engine 22 (hereinafter referred to as the ICE torque actual), a desired deceleration limited regeneration torque request, a first axle 24 propulsion torque, a second axle 34 propulsion torque, an energy storage system State Of Charge (SOC) dependent region (hereinafter referred to as the battery SOC dependent region), a left side second axle 34 friction brake torque (hereinafter referred to as the LF friction brake torque), a right side second axle 34 friction brake torque (hereinafter referred to as the RF friction brake torque), a left side first axle 24 friction brake torque (hereinafter referred to as the LR friction brake torque), and a right side first axle 24 friction brake torque (hereinafter referred to as the RR friction brake torque).

The above current dynamic vehicle operating condition inputs may be directly sensed by one or more vehicle 20 sensors, and that data related to the respective input communicated to the vehicle controller 36. Alternatively, the vehicle controller 36 may communicate with other vehicle 20 system controllers to request and receive that data related to the respective inputs. Furthermore, it should be appreciated that the vehicle controller 36 may obtain the inputs required to execute the optimized regeneration control strategy in some other manner not specifically noted or described herein. The different inputs that the vehicle controller 36 uses to implement the optimized regeneration control strategy are known and commonly used by various different vehicle 20 control systems for different vehicle 20 operations. Accordingly, the specific detection and/or the process of determining or calculating each of the above noted inputs into the vehicle controller 36 are known to those skilled in the art, and are therefore not described in detail herein. As used herein, the following inputs are defined as follows.

The "driver's desired deceleration" is an amount or rate of deceleration, i.e., negative acceleration, requested by a driver, such as by depressing a brake pedal.

The "ICE torque actual" is the actual amount of torque being output from the internal combustion engine 22.

The "desired deceleration limited regeneration torque request" is an amount of torque requested to be used toward regeneration or charging of the energy storage device 38, and is calculated by reducing a maximum regeneration torque limit that the electric device 32 is capable of based on the current dynamic operating conditions of the vehicle 20, including the amount of deceleration requested by the driver. Accordingly, the desired deceleration limited regeneration torque request is equal to the maximum regeneration torque limit of the electric device 32 decreased by an amount that depends upon the amount of deceleration of the vehicle 20.

The "first axle 24 propulsion torque" is the amount of torque that the first axle 24 is supplying to the wheels 28 attached to the first axle 24 for propelling the vehicle 20.

The "second axle 34 propulsion torque" is the amount of torque that the second axle 34 is supplying to the wheels 28 attached to the second axle 34 for propelling the vehicle 20.

The "battery SOC dependent region" is one of a plurality of defined regions or modes that enable regeneration of the energy storage device 38 for different dynamic vehicle operating conditions. Specifically, the battery SOC dependent region may be defined as a first region (region 1), a second region (region 2), a third region (region 3), or a fourth region (region 4). The first region is generally defined as a normal street driving region, in which the dynamic operating conditions of the vehicle 20 are limited to between, for example, 20% to 30% of maximum possible deceleration and lateral acceleration capabilities of the vehicle 20. The second through fourth regions are generally defined as progressively more aggressive driving regions, in which the dynamic operating conditions of the vehicle 20 are less limited than the first region. For example, the second region may be limited to between, for example, 50% to 70% of maximum possible deceleration and lateral acceleration capabilities of the vehicle 20, whereas the third region may include up to 100% of maximum possible deceleration and lateral capabilities. The fourth region may be defined as a region that includes forward acceleration, as well all deceleration and lateral acceleration included in the third region.

The "LF friction brake torque" is the amount of friction braking currently being applied to the left side of the second axle 34 (front axle in the exemplary embodiment shown in FIG. 1).

The "RF friction brake torque" is the amount of friction braking being applied to the right side of the second axle 34 (front axle in the exemplary embodiment shown in FIG. 1).

A "front axle friction torque" is the cumulative amount of friction braking being applied to both the right side and the left side of the second axle 34.

The "LR friction brake torque" is the amount of friction braking being applied to the left side of the first axle 24 (rear axle in the exemplary embodiment shown in FIG. 1).

The "RR friction brake torque" is the amount of friction braking being applied to the right side of the first axle 24 (rear axle in the exemplary embodiment shown in FIG. 1).

A "rear axle friction torque" is the cumulative amount of friction braking being applied to both the right side and the left side of the first axle 24.

Once the vehicle controller 36 has received the data related to all necessary dynamic vehicle operating condition inputs, such as described above for example, the vehicle controller 36 follows a process to determine if the driver's desired deceleration limited regeneration torque request may be increased, and if so, how much may it be increased without excessively affecting a yaw rate of the vehicle 20.

The process begins by the vehicle controller 36 determining if the battery SOC dependent region is equal or defined as the region 1, or if the battery SOC dependent region is equal to or defined as region 2 or region 3, generally indicated by box 52. Region 4 is only applicable during dynamic operating conditions when the vehicle 20 is accelerating, and therefore is not applicable or a possible region for the battery SOC dependent region for this process, which is limited to current dynamic vehicle operating conditions in which the vehicle 20 is currently decelerating.

If the vehicle controller 36 determines that the battery SOC dependent region is equal to or defined as region 1, generally indicated at 54, then an increase in the driver's desired deceleration limited regeneration torque request is not allowed, and the value of the driver's desired deceleration limited regeneration torque request remains constant and is not modified, generally indicated by box 56.

If the vehicle controller 36 determines that the battery SOC dependent region is equal to or defined as either region 2 or region 3, generally indicated at 58, then an increase in the driver's desired deceleration limited regeneration torque request is authorized, and the process continues. In order to determine how much the driver's desired deceleration limited regeneration torque request may be increased, the vehicle controller 36 calculates a regeneration torque overhead value, generally indicated by box 60. The regeneration torque overhead value is calculated by subtracting the driver's desired deceleration limited regeneration torque request from the maximum regeneration torque limit that the electric device 32 is capable of. The regeneration torque overhead represents the available torque capacity for regeneration, above and beyond the driver's desired deceleration limited regeneration torque request.

Once the vehicle 20 has calculated the regeneration torque overhead, then the vehicle controller 36 determines if the regeneration torque overhead is less than the numerical summation of the rear axle friction torque and the ICE torque actual [(rear axle friction torque)+(ICE torque actual)], generally indicated by box 62. If the vehicle controller 36 determines that the regeneration torque overhead is less than the numerical summation of the rear axle friction torque and the ICE torque actual, generally indicated at 64, then the vehicle controller 36 calculates a modified front axle regeneration torque request by summing the driver's desired deceleration limited regeneration torque request with the regeneration torque overhead, effectively defining the modified front axle regeneration torque request to equal the maximum regeneration torque limit that the electric device 32 is capable of, generally indicated by box 66. In addition, also indicated by box 66, the combined total of the rear axle friction torque and the ICE torque actual is reduced by the regeneration torque overhead to maintain the overall deceleration of the vehicle 20 that was originally requested by the driver.

If the vehicle controller 36 determines that the regeneration torque overhead is not less than the numerical summation of the rear axle friction torque and the ICE torque actual, generally indicated at 68, then the vehicle controller 36 calculates or defines the modified front axle regeneration torque request as the numerical summation of the rear axle friction torque, ICE torque actual, and the driver's desired deceleration limited regeneration torque request, generally indicated by box 70. Accordingly, in this situation, the modified front axle regeneration torque request is equal to the summation of the rear axle friction torque, the ICE torque actual, and the driver's desired deceleration limited regeneration torque. Additionally, also indicated by box 70, the combined total of the rear axle friction torque and the ICE torque actual is reduced by the modified front axle regeneration torque request to maintain the overall deceleration of the vehicle 20 that was originally requested by the driver.

As part of calculating and/or defining the modified front axle regeneration torque request, as indicated by either box 66 or box 70, the vehicle controller 36 also defines a modified torque value for each friction braking device 30 for each respective wheel 28 of the vehicle 20. Accordingly, the vehicle controller 36 defines a LF modified torque value, a RF modified torque value, a LR modified torque value, and a RR modified torque value. The sum of the LF modified torque value and the RF modified torque value is generally equal to the modified front axle regeneration torque request, and the sum of the LR modified torque value and the RR modified torque value is generally equal to the modified rear axle torque request. The modified torque values for the friction braking devices 30 of each respective wheel 28 are calculated to achieve the modified front axle regeneration torque request.

Once the vehicle controller 36 has calculated and/or defined the modified front axle regeneration torque request, the LF modified torque value, the RF modified torque value, the LR modified torque value, and the RR modified torque value, then the vehicle controller 36 calculates an estimated yaw rate of the vehicle 20, generally indicated by box 72. The estimated yaw rate is based on the values of the modified front axle regeneration torque request, the LF modified torque value, the RF modified torque value, the LR modified torque value, and the RR modified torque value. The estimated yaw rate is defined herein as an estimated amount of change in the yaw rate of the vehicle 20 if the modified front axle regeneration torque request, the LF modified torque value, the RF modified torque value, the LR modified torque value, and the RR modified torque value, are applied as calculated. As used herein, the "yaw" of the vehicle 20 is defined as an angle, to the right or left, determined by the direction of travel of the vehicle 20 relative to a longitudinal plane of symmetry of the vehicle 20. The "yaw rate" is defined herein as the change in yaw over time. Accordingly, the estimated yaw rate is an estimate of how much the yaw rate of the vehicle 20 will change if the modified front axle regeneration torque request, the LF modified torque value, the RF modified torque value, the LR modified torque value, and the RR modified torque value are applied.

Once the vehicle controller 36 has calculated the estimated yaw rate, the vehicle controller 36 determines if an allowable regeneration yaw rate target is greater than the estimated yaw rate, or if the allowable regeneration yaw rate target is not greater than the estimated yaw rate, generally indicated by box 74. The allowable regeneration yaw rate target is a user defined or model based limit in the change in the yaw rate for the current dynamic vehicle operating conditions. Accordingly, the vehicle controller 36 will calculate the allowable regeneration yaw rate target for the current dynamic vehicle operating conditions.

If the vehicle controller 36 determines that the allowable regeneration yaw rate target is greater than the estimated yaw rate, i.e., implementation of the modified front axle regeneration torque request, the LF modified torque value, the RF modified torque value, the LR modified torque value, and the RR modified torque value will not change the yaw rate of the vehicle 20 more than is allowed, generally indicated at 76, then the vehicle controller 36 may send or communicate a control signal to the respective components of the vehicle 20, generally indicated by box 78, in order to implement the modified front axle regeneration torque request, the LF modified torque value, the RF modified torque value, the LR modified torque value, and the RR modified torque value. Accordingly, the vehicle controller 36 may modify the friction braking applied at the wheels 28 for one or both of the first axle 24 and/or the second axle 34, the vehicle controller 36 may increase or reduce the torque output from the internal combustion engine 22 and/or the electric device 32, and the vehicle controller 36 may control the electric device 32 to provide a desired amount of regeneration for charging for the energy storage device 38.

However, if the vehicle controller 36 determines that the allowable regeneration yaw rate target is not greater than the estimated yaw rate, i.e., implementation of the modified front axle regeneration torque request, the LF modified torque value, the RF modified torque value, the LR modified torque value, and the RR modified torque value will change the yaw rate of the vehicle 20 more than is allowed, generally indicated at 80, then the vehicle controller 36 does not implement the modified front axle regeneration torque request, the LF modified torque value, the RF modified torque value, the LR modified torque value, and the RR modified torque value, as currently defined. In this situation, as indicated by box 82, the vehicle controller 36 back-calculates values for each of the modified front axle regeneration torque request, the LF modified torque value, the RF modified torque value, the LR modified torque value, and the RR modified torque value, until the allowable regeneration yaw rate target is greater than the estimated yaw rate. Back-calculating the values for each of the modified front axle regeneration torque request, the LF modified torque value, the RF modified torque value, the LR modified torque value, and the RR modified torque value may include, for example, an incremental or iterative process that incrementally decreases the values for each of the modified front axle regeneration torque request, the LF modified torque value, the RF modified torque value, the LR modified torque value, and the RR modified torque value, recalculates the estimated yaw rate for these revised values, and then re-compares the revised estimated yaw rate to the allowable regeneration yaw rate target. This iterative process may be continued until the revised values of the modified front axle regeneration torque request, the LF modified torque value, the RF modified torque value, the LR modified torque value, and the RR modified torque value produce an estimated yaw rate that is less than the allowable regeneration yaw rate target. These revised values for the modified front axle regeneration torque request, the LF modified torque value, the RF modified torque value, the LR modified torque value, and the RR modified torque value are the values that are then communicated to their respective components, generally indicated by box 78.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a vehicle, the method comprising:

calculating a desired deceleration limited regeneration torque request, with a vehicle controller, based on a requested deceleration input;

increasing the desired deceleration limited regeneration torque request, with the vehicle controller, based on available additional regeneration capacity of the vehicle, to a level that will not change a yaw rate of the vehicle more than an allowable yaw rate target, wherein the increased desired deceleration limited regeneration torque request value is defined as a modified axle regeneration torque request;

sending a control signal to a friction braking device at each wheel of the vehicle, with the vehicle controller, to control the friction braking device at each wheel of the vehicle to achieve the modified axle regeneration torque request;

determining if current dynamic vehicle operating conditions are disposed within a performance region that permits an increase in the desired deceleration limited regeneration torque request, or are not disposed within a performance region that permits an increase in the desired deceleration limited regeneration torque request, with the vehicle controller;

calculating a regeneration torque overhead value, with the vehicle controller, from a total available regeneration capacity of the energy regeneration device and the desired deceleration limited regeneration torque request, when the current dynamic vehicle operating conditions are disposed within one of a plurality of performance regions that permits an increase in the desired deceleration limited regeneration torque request; and determining which one of the plurality of performance regions the current dynamic vehicle operating conditions of the vehicle are currently disposed in, wherein the plurality of performance regions includes:
 a first region in which the current dynamic vehicle operating conditions of the vehicle are limited to between 20% and 30% of a maximum possible deceleration and a maximum possible lateral acceleration of the vehicle;
 a second region in which the current dynamic vehicle operating conditions of the vehicle are limited to between 50% and 70% of the maximum possible deceleration and the maximum possible lateral acceleration of the vehicle; and
 a third region in which the current dynamic vehicle operating conditions of the vehicle may include up to 100% of the maximum possible deceleration and the maximum possible lateral acceleration of the vehicle.

2. The method set forth in claim 1, further comprising defining a modified torque value for each wheel of the vehicle required to achieve the modified axle regeneration torque request, with the vehicle controller.

3. The method set forth in claim 2, further comprising calculating an estimated yaw rate of the vehicle based on the modified front axle regeneration torque request and the modified torque values for each wheel of the vehicle, with the vehicle controller.

4. The method set forth in claim 3, further comprising comparing an allowable regeneration yaw rate target to the estimated yaw rate to determine if the allowable regeneration yaw rate target is greater than the estimated yaw rate, or if the allowable regeneration yaw rate target is equal to or less than the estimated yaw rate, with the vehicle controller.

5. The method set forth in claim 4, further comprising maintaining the defined values of the modified axle regeneration torque request and the modified torque values for each wheel of the vehicle when the allowable regeneration yaw rate target is greater than the estimated yaw rate, with the vehicle controller.

6. The method set forth in claim 4, further comprising re-defining the modified axle regeneration torque request and the modified torque values for each wheel of the vehicle, with the vehicle controller, to values that limit the estimated yaw rate to less than the allowable regeneration yaw rate target, when the allowable regeneration yaw rate target is not greater than the estimated yaw rate.

7. A vehicle comprising:
 an axle having at least one wheel rotatably attached thereto;
 a friction device coupled to the at least one wheel and operable for slowing rotation of the at least one wheel in response to a control signal;
 an energy regeneration device coupled to the axle, and operable to transform kinetic energy of the at least one wheel into some other form of energy;
 a vehicle controller coupled to the at least one friction device of the at least one wheel, and including a processor and a memory having an increased regeneration determination algorithm saved thereon, wherein the processor is operable to execute the increased regeneration determination algorithm to:
  calculate a desired deceleration limited regeneration torque request based on a requested deceleration input;
  determine if current dynamic vehicle operating conditions are disposed within a performance region that permits an increase in the desired deceleration limited regeneration torque request, or are not disposed within a performance region that permits an increase in the desired deceleration limited regeneration torque request, with the vehicle controller;
  increase the desired deceleration limited regeneration torque request based on available additional regeneration capacity of the vehicle, to a level that will not change a yaw rate of the vehicle more than an allowable yaw rate target, wherein the increased desired deceleration limited regeneration torque request value is defined as a modified axle regeneration torque request; and
  send a control signal to a friction braking device at each wheel of the vehicle to control the friction braking device at each wheel of the vehicle to achieve the modified axle regeneration torque request.

8. The vehicle set forth in claim 7, wherein the increased regeneration determination algorithm is executable to calculate a regeneration torque overhead value, with the vehicle controller, from the total available regeneration capacity of the energy regeneration device and the desired deceleration limited regeneration torque request, when the current dynamic vehicle operating conditions are disposed within one of a plurality of performance regions that permits an increase in the desired deceleration limited regeneration torque request.

9. The vehicle set forth in claim 8, wherein the increased regeneration determination algorithm is executable to determine which one of the plurality of performance regions the current dynamic operating conditions of the vehicle are currently disposed in.

10. The vehicle set forth in claim 9, wherein the increased regeneration determination algorithm is executable to define a modified torque value for each wheel of the vehicle required to achieve the modified axle regeneration torque request, with the vehicle controller.

11. The vehicle set forth in claim 10, wherein the increased regeneration determination algorithm is executable to calculate an estimated yaw rate of the vehicle based on the modified front axle regeneration torque request and the modified torque values for each wheel of the vehicle, with the vehicle controller.

12. The vehicle set forth in claim 11, wherein the increased regeneration determination algorithm is executable to compare an allowable regeneration yaw rate target to the estimated yaw rate to determine if the allowable regeneration yaw rate target is greater than the estimated yaw rate, or if the allowable regeneration yaw rate target is equal to or less than the estimated yaw rate, with the vehicle controller.

13. The vehicle set forth in claim 12, wherein the increased regeneration determination algorithm is executable to maintain the defined values of the modified axle regeneration torque request and the modified torque values for each wheel of the vehicle when the allowable regeneration yaw rate target is greater than the estimated yaw rate, with the vehicle controller.

14. The vehicle set forth in claim 13, wherein the increased regeneration determination algorithm is executable to re-define the modified axle regeneration torque request and the modified torque values for each wheel of the vehicle, with the vehicle controller, to values that limit the estimated yaw rate to less than the allowable regeneration yaw rate target, when the allowable regeneration yaw rate target is not greater than the estimated yaw rate.

* * * * *